United States Patent

Whited et al.

[11] Patent Number: 5,971,427
[45] Date of Patent: Oct. 26, 1999

[54] SIDE IMPACT AIR BAG CLAMSHELL-WRAP AROUND STRAP CLOSURE

[75] Inventors: Timothy J. Whited, Auburn Hills; James N. Sonnenberg, Royal Oak, both of Mich.

[73] Assignee: Autoliv ASP, Inc., Ogden, Utah

[21] Appl. No.: 08/982,828

[22] Filed: Dec. 2, 1997

[51] Int. Cl.⁶ ................................................ B60R 21/22
[52] U.S. Cl. ................................. 280/730.2; 280/743.1; 280/728.3
[58] Field of Search ................................ 280/730.1, 732, 280/743.1, 728.2, 728.3

[56] References Cited

U.S. PATENT DOCUMENTS

| | | | |
|---|---|---|---|
| 5,553,887 | 9/1996 | Karlow et al. | 280/730.2 |
| 5,645,295 | 7/1997 | White, Jr. et al. | 280/730.2 |
| 5,810,390 | 8/1998 | Enders et al. | 280/730.2 |
| 5,833,263 | 11/1998 | Wittmann et al. | 280/730.2 |

*Primary Examiner*—Kenneth R. Rice
*Attorney, Agent, or Firm*—Ohlandt, Greeley, Ruggiero & Perle, LLP; George W. Rauchfuss, Jr.

[57] ABSTRACT

An air bag assembly includes an inflatable device having a deflated condition; an inflator in fluid communication with the inflatable device and actuatable to provide inflation fluid for inflating the inflatable device from the deflated condition; a cover for housing the inflatable device and the inflator, the cover including a first portion and a second portion, the first portion and the second portion being pivotable to a closed condition and an open condition; and a strap for releasably retaining the first portion and the second portion in the closed condition, the strap having a rupturable portion, wherein the force of inflation of the inflatable device causes the rupturable portion to rupture and release the first portion and the second portion from the closed condition, thereby enabling the first portion and the second portion to pivot to the open condition and enabling inflation of the inflation device from the cover.

29 Claims, 5 Drawing Sheets

5,971,427

SIDE IMPACT AIR BAG CLAMSHELL-WRAP AROUND STRAP CLOSURE

FIELD OF THE INVENTION

The present invention relates to a vehicle safety apparatus and, more particularly, relates to a side impact air bag arrangement employing a clamshell cover with tear away straps.

BACKGROUND OF THE INVENTION

An air bag module is part of an inflatable restraint system that is employed in an automobile for protecting an occupant against injury by physically restraining the occupant's body when the automobile encounters a collision. A side impact air bag module protects occupants from side collisions to the automobile and can be positioned in a seat, on the exterior of a seat, in a door or in a side pillar. A side impact air bag module typically includes an air bag cushion and an inflator contained within a reaction canister. The inflator has an elongated cylindrical housing having gas exhaust ports and containing gas generant that, once triggered by a remote collision sensor, provides the inflation gas for inflating the air bag cushion. A hybrid inflator has gas exhaust ports located centrally or at one end while pyrotechnic inflators have gas exhaust ports distributed substantially along their entire length.

In the event of an impact, the inflator is actuated, and the air bag is inflated into a position between the vehicle occupant in the vehicle seat and the adjacent side structure of the vehicle. The air bag protects the vehicle occupant from forcibly being struck by parts of the side structure of the vehicle. The air bag can also help protect the vehicle occupant from objects which might intrude into the vehicle, such as a pole or a tree, during the side impact.

There is a need to reduce the size of an air bag module, the number of parts of an air bag module assembly and the overall manufacturing costs of an air bag module assembly.

Recently, it has been proposed to employ an air bag module with a clamshell-type cover for housing an air bag inflator and an inflatable air bag. Such a cover arrangement requires fewer parts, less assembly time, is conducive to the automated assembly and helps reduce the complexity and size of an air bag module.

One such air bag module is disclosed in U.S. Pat. No. 5,645,295 to White, Jr. et al. The air bag module includes an air bag, an inflator assembly and a cover. The cover includes first and second cover parts which are releasably interconnected by a rupturable portion of the cover. The cover has a closed condition in which the first and second cover parts enclose the air bag when the air bag is in a deflated condition. The rupturable portion of the cover forms a first hinge about which the cover parts are pivotable relative to each other into the closed condition, during assembly thereof. A second hinge is formed where the inflator assembly is mounted in the cover. When the air bag inflates, the rupturable portion of the cover is ruptured and the first and second cover parts pivot about the second hinge to enable the air bag to inflate out of the cover.

In the air bag module of said U.S. Pat. No. 5,645,295, the clamshell-type cover utilizes a rupturable hinge portion which ruptures when the air bag inflates. Although the clamshell cover of U.S. Pat. No. 5,645,295 provides the benefits of a less complex and reduced size air bag module, the cover arrangement requires that inflator is assembled directly opposite the rupturable hinge. Such an arrangement limits the possibility of arranging the inflator assembly in other orientations than opposite that of the rupturable hinge. Moreover, such an arrangement limits the ability to design the first and second cover parts to enable the air bag to inflate from the cover at any desired location, particularly with respect to the inflator assembly.

SUMMARY OF THE INVENTION

It is therefore an object of the present invention to provide an air bag module with a low cost clamshell cover arrangement that allows for more design flexibility.

It is a further object of the present invention to provide an air bag module with a cover retaining arrangement that increases the design flexibility of the cover parts and the arrangement of the inflator assembly and air bag therein.

Accordingly, this invention provides an air bag module including an air bag having a deflated condition, and an inflator in fluid communication with the inflatable device and actuatable to provide inflation fluid for inflating the inflatable device from the deflated condition. The air bag module also includes a cover for housing the air bag and the inflator. The cover has a first portion and a second portion which are pivotable to a closed condition and an open condition. The air bag module further includes a strap, having a rupturable portion, for releasably retaining the first portion and the second portion in the closed condition. In operation, the force of inflation of the air bag causes the rupturable portion of the strap to rupture and release the first portion and the second portion from the closed condition, thereby enabling the first portion and the second portion to pivot to the open condition and enabling inflation of the inflation device from the cover.

The invention together with further objects, features, advantages and aspects thereof, will be more clearly understood from the following description taken in connection with the accompanying drawings.

BRIEF DESCRIPTION OF THE DRAWINGS

The same reference numerals refer to the same elements throughout the various figures.

DETAILED DESCRIPTION OF THE INVENTION

Figure 1:
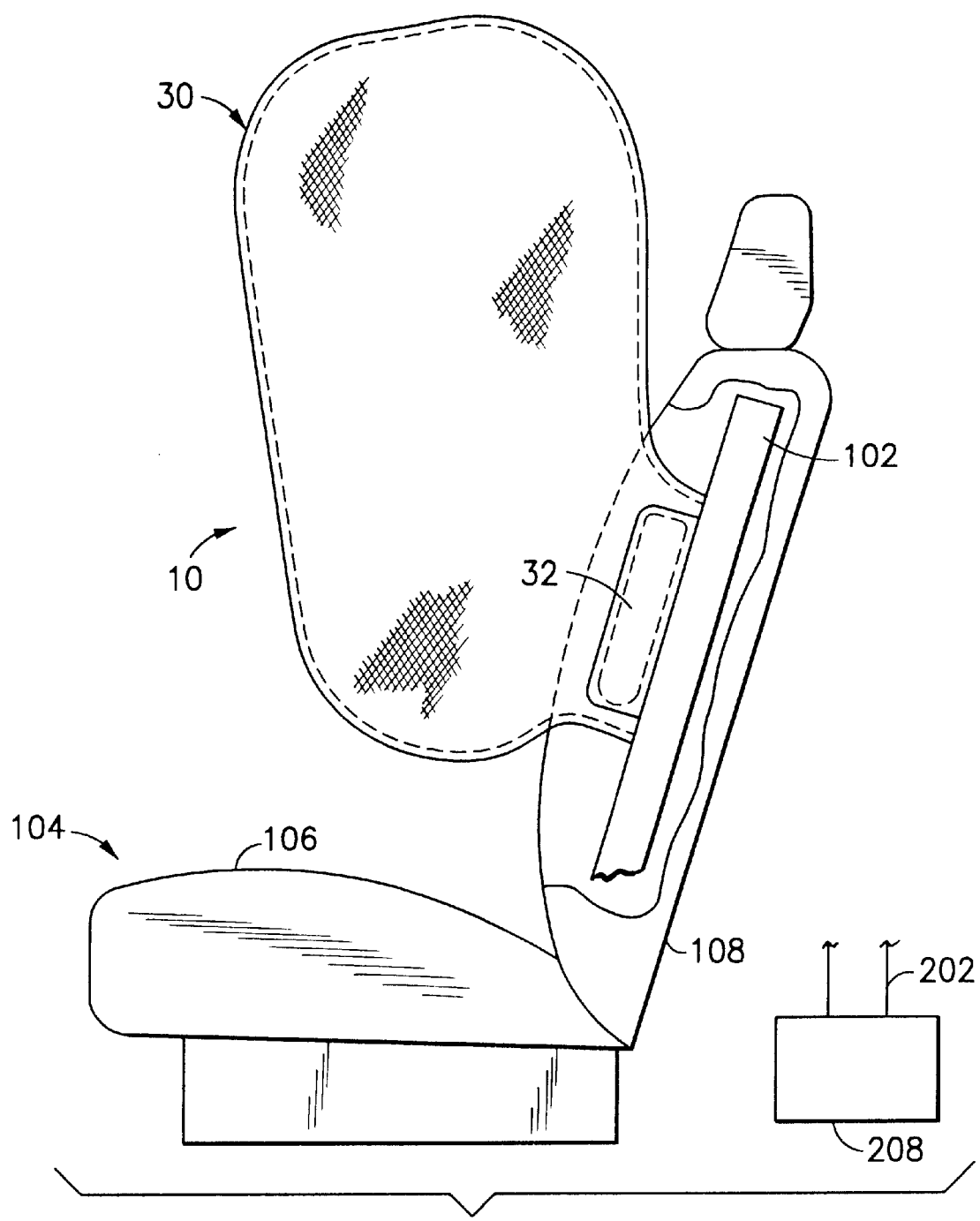
FIG. 1 is a schematic side elevational view of a vehicle seat and an air bag module in accordance with the present invention.

Referring to FIG. 1, air bag module 10 is connected to a seat frame member 102 of a seat 104 for an occupant of a vehicle. Seat 104 includes a seat bottom cushion 106 and a seatback 108 connected with the seat bottom cushion. Air bag module 10 includes an inflatable device, typically referred to as an air bag 30, and an inflator assembly 32 in fluid communication with air bag 30. Inflator assembly 32 is shown schematically in FIG. 1. Air bag 30 is preferably made from an suitable material, such as woven nylon, and the like. The use of plastic film may require one or more inflation fluid vents (not shown) to be formed in air bag 30.

Inflator assembly 32 preferably contains a stored quantity of pressurized inflation fluid and an ignitable material for heating the inflation fluid. In the alternative, air bag module 10 may include an inflator which employs the combustion of gas-generating material to generate sufficient inflation fluid in the form of gas to inflate air bag 30.

A series of fluid outlets 38 (FIG. 3) are formed in inflator assembly 32 for directing inflation fluid to flow from inflator assembly 32 into air bag 30. Fluid outlets 38 may be arranged in a straight line which extends parallel to an axis 36 of air bag module 10. A plurality of mounting studs 34 extend radially outward from inflator assembly 32 opposite fluid outlets 38.

Figure 2:
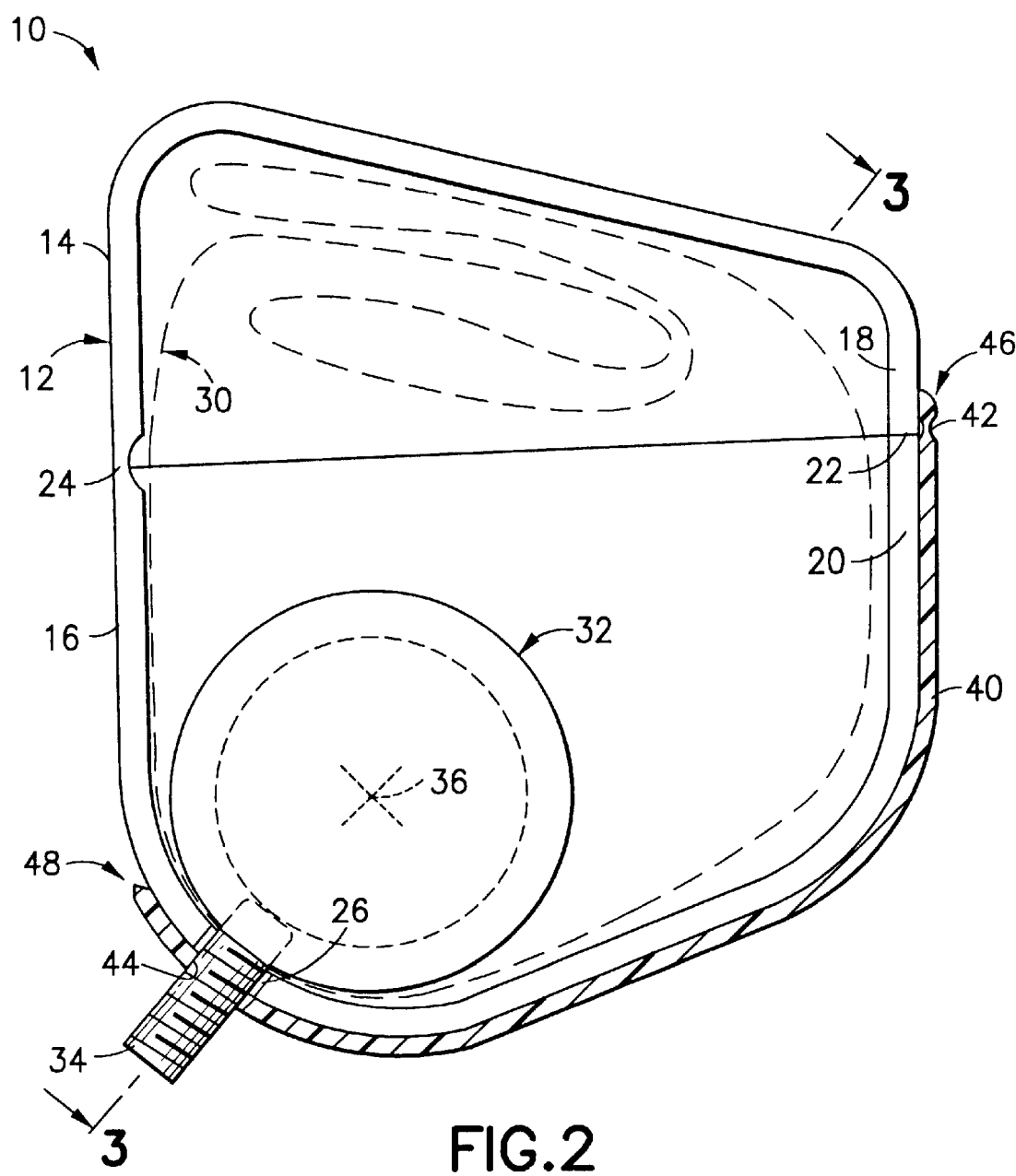
FIG. 2 is a transverse section view through the air bag module of FIG. 1, including a cover which forms a part of the air bag module and which is shown in a closed condition.
Figure 3:
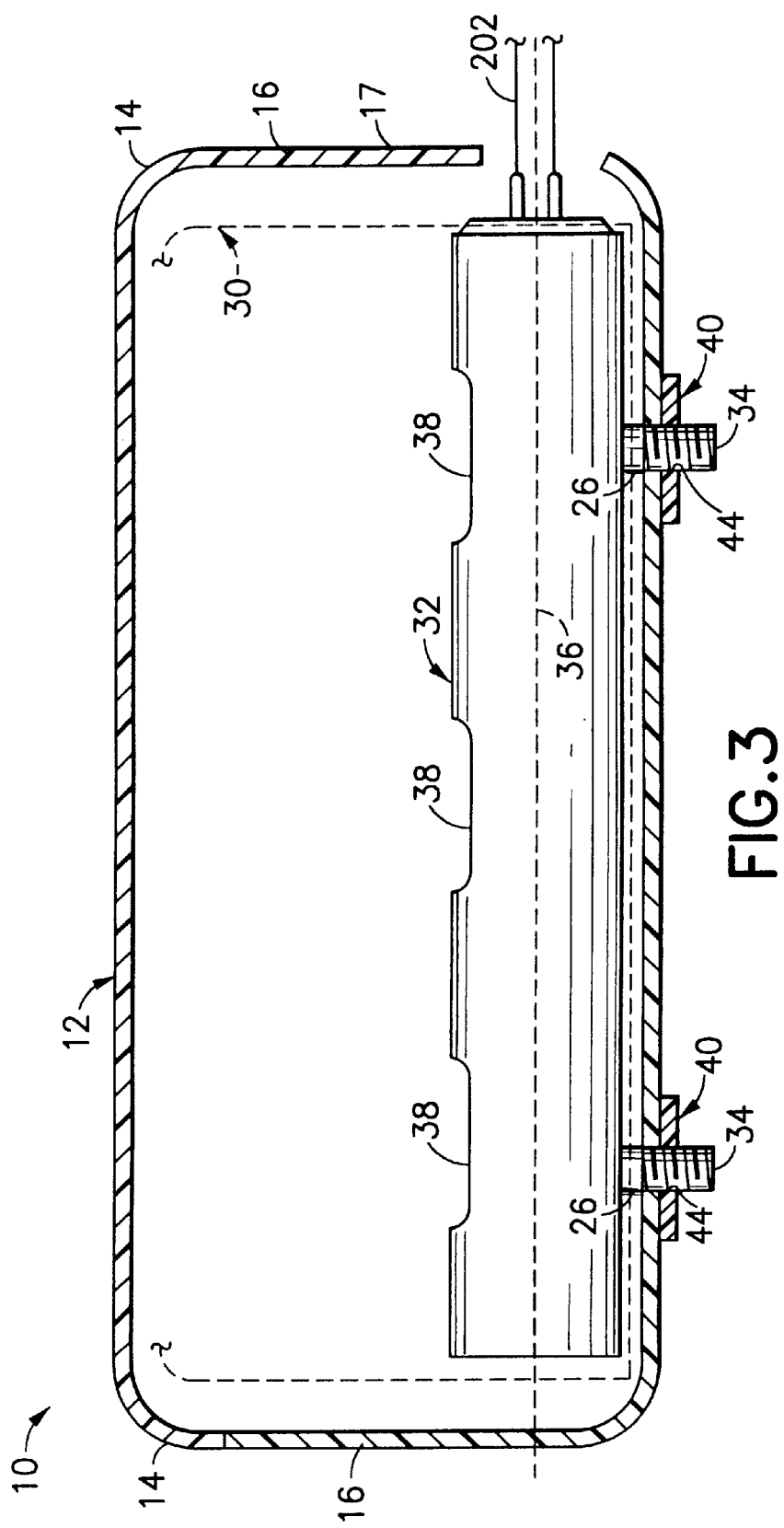
FIG. 3 is a longitudinal view through the air bag module of FIG. 1.
Figure 4:
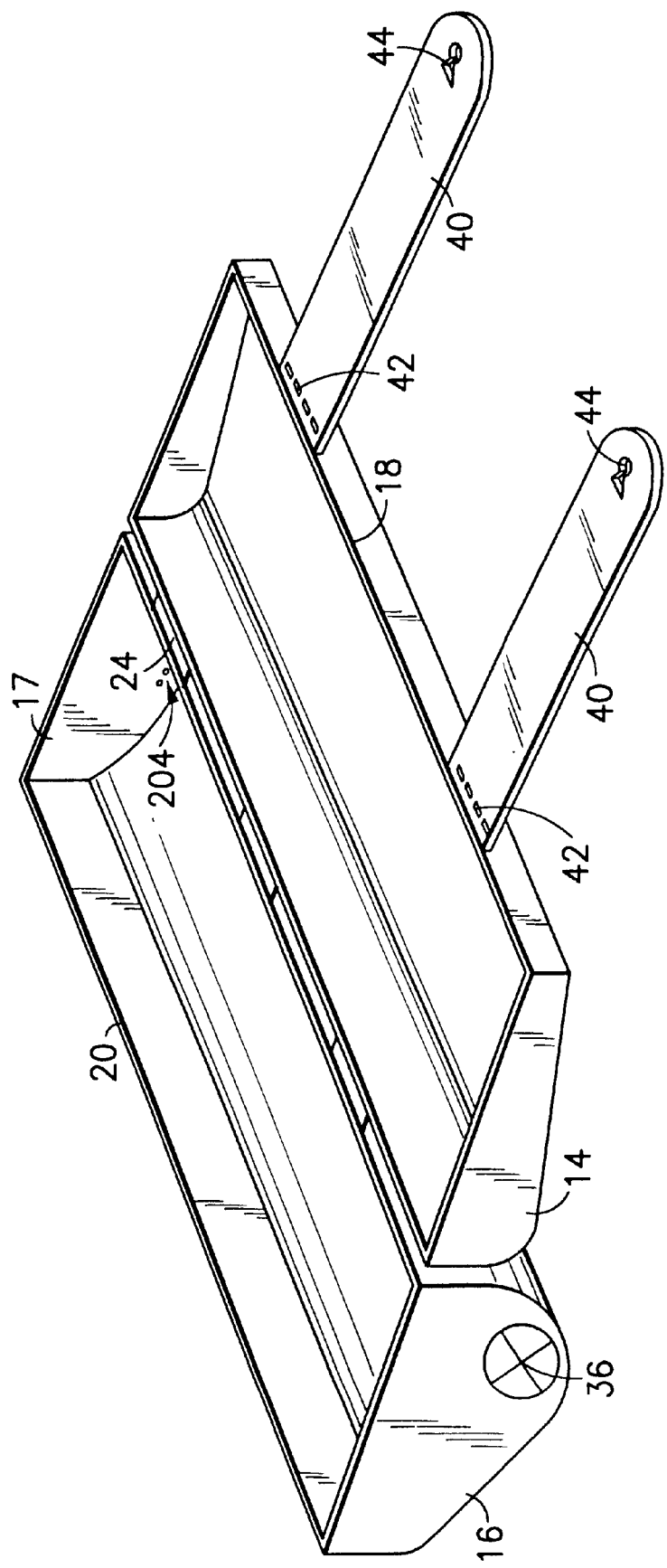
FIG. 4 is a perspective view of a cover of FIG. 2.

As shown in FIGS. 2, 3 and 4, air bag module 10 further includes a cover member 12 for housing air bag 30 and inflator assembly 32. Cover member 12 has a clamshell configuration which includes a first cover portion 14 and a second cover portion 16. First and second cover portions 14 and 16 are connected by at least one hinge or flexible joint 24 (FIGS. 2 and 4) which enables relative pivotable movement between first and second cover portions 14 and 16. Hinge 24 can be a separate component pivotably connecting first and second cover portions 14 and 16, but is preferably a thinned portion of molded cover member 12. First and second cover portions 14 and 16 are thus pivotable to an open condition (FIG. 4) or closed condition (FIG. 2) at an opening point 22 between first edge portion 18 and second edge portion 20 of their respective cover portions. Cover member 12 is preferably made from a material which is strong enough to protect the internal components of air bag module 10. Such materials are preferably slightly flexible or deformable so that the cover member is not perceived by an occupant of seat 104 as being a hard or rigid component in seat back 102. It is preferred that cover member 12 is made of a molded thermoplastic polymer or the like.

Second cover portion 16 includes a plurality of spaced-apart mounting holes 26 for receiving respective mounting studs 34 of inflator assembly 32. As shown in FIG. 2, when inflator assembly 32 is mounted in second cover portion 16, mounting studs 34 are received by respective mounting holes 26 and project or extend therethrough. First cover portion 14 (FIGS. 2 and 4) has connected thereto at least one strap 40, but preferably a plurality of spaced-apart straps 40. Although strap 40 can be a separate component assembled onto first cover portion 14, it is preferred that strap 40 is integrally formed with first cover portion 14 to decrease the number of assembly steps and, thus, the overall manufacturing cost of air bag module 10.

Each strap 40 includes a first end 46 and a second end 48. First end 46 is connected at or proximal to a frontal exterior portion of first edge 18 of first cover portion 14. Second end 48 includes an opening 44 configured to mate with projecting mounting stud 34 of inflator assembly 32. Strap 40 can thus be wrapped across opening point 22, and the second end 48 of strap 40 can be connected to projecting mounting stud 34, thereby retaining first and second cover portions 18 and 20 in the closed condition. Strap 40 is configured with a predetermined length to snugly and tightly fit against the exterior surface of cover member 12, when strap 40 is connected to projecting mounting stud 34. It is preferred that opening 44 has a key-hole shape to provide increased interconnection when second end 48 of strap 40 is connected to mounting stud 34. Although strap 40 is preferably connected to projecting mounting stud 34, strap 40 may also be connected to other types of mating structures either formed or connected to cover member 12.

Strap 40 further includes a rupturable portion 42, preferably located at or proximal first end 46 of strap 40. Rupturable portion 42 is configured to break or tear due to the inflation force of air bag 10, thereby enabling first and second cover portion 14 and 16 to move apart and enabling inflation of air bag 30 from cover member 12. Rupturable portion 42 and strap 40 can be made of the same material as cover member 12, but preferably of a thermoplastic polymer material or the like.

Although rupturable portion 42 is shown as being preferably located at or proximal to first end 46 of strap 40, rupturable portion 42 can be located anywhere along the length of strap 40. Furthermore, instead of connecting strap 40 to first and second cover portions 18 and 20 as in the preferred embodiment, strap 40 can be wrapped around the cover member with, for example, first end 46 and second end 48 being connected at rupturable portion 42 to retain cover member 12 in the closed condition. Accordingly, strap 40 can be arranged in various ways to retain first and second cover portions 18 and 20 in the closed condition, in accordance with the present invention.

Figure 5:
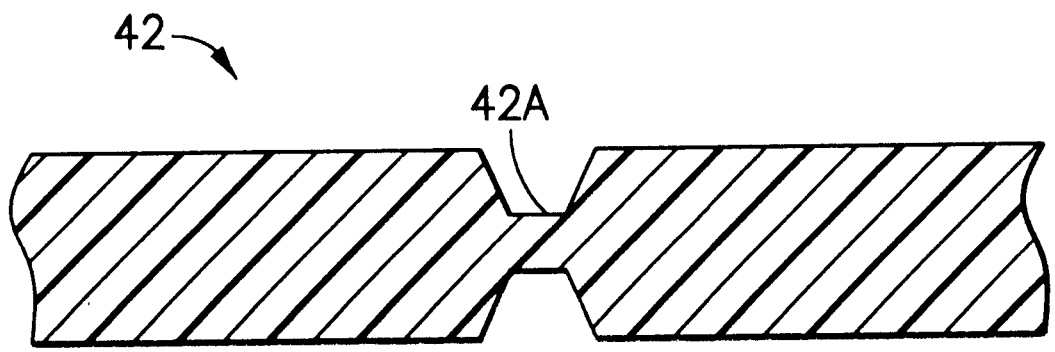
FIG. 5 is an expanded side view of a rupturable portion of a strap of FIG. 4.
Figure 6:
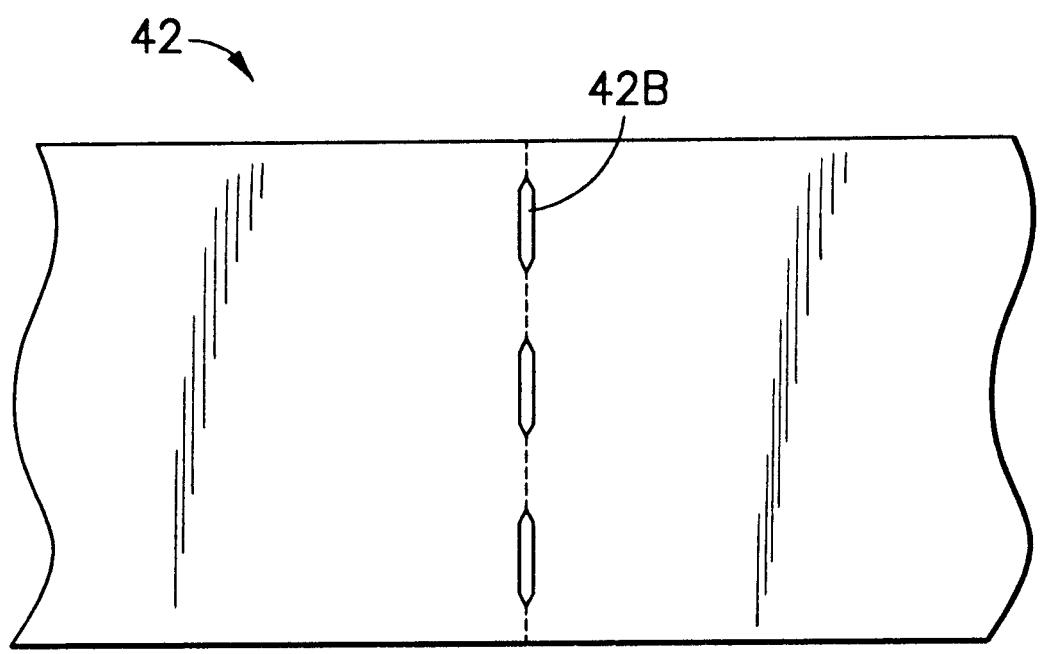
FIG. 6 is an expanded perspective view of a rupturable portion of a strap of FIG. 4.

Referring to FIGS. 5 and 6, there is provided various embodiments of rupturable portion 42 of strap 40. Rupturable portion 42 (FIG. 5) may include at least one indentation or groove 42A, but preferably a plurality of spaced-apart indentations 42A running across a width of the rupturable portion or a single indentation running across the width of the rupturable portion. Rupturable portion 42 may also include at least one hole 42B, as shown in FIG. 6. The term "hole 42B" will hereinafter also refer to a slit, perforation, notch or the like which weakens the structure of strap 40. It is preferred that rupturable portion 42 include a plurality of spaced-apart holes 42B that are aligned along a row across a width of rupturable portion 42. Indentations 42A and holes 42B can be molded, embossed or cut on strap 40 to form rupturable portion 42.

Although various preferred forms of rupturable portion 42 have been described above, rupturable portion 42 may be formed of any material or in any pattern which breaks when a predetermined air bag inflation force is applied thereto. For example, rupturable portion 42 may be configured with any number of indentations 42A, any number of holes 42B and any combination of indentations 42A and holes 42B. Indentations 42A, holes 42B or the combination thereof can be arranged randomly, in a row, in multiple rows and so forth. Rupturable portion 42 may also have a smaller cross-sectional area (i.e., smaller thickness and/or width) than an adjacent portion(s) of strap 40.

Referring to FIGS. 2, 3 and 4, in an assembly of air bag module 10, air bag 30 is mounted on inflator assembly 32 and both are arranged in open cover member 12. Specifically, inflator assembly 32 is arranged in cover member 12 with mounting studs 34 mating with respective mounting holes 26 of second cover portion 16. When inflator assembly is mounted in second cover portion 16, mounting studs 34 of inflator assembly 32 project through their respective mounting holes 26 and extend from an exterior surface of second cover portion 16. First and second cover portion 14 and 16 are then pivotably moved to a closed condition (FIGS. 2 and 3). Air bag 30 is folded to fit within cover member 12 when the cover member is in the closed condition.

Thereafter, strap 40 is wrapped across opening point 22 of cover member 12 and is connected to projecting mounting stud 34, such that strap opening 44 mates with projecting mounting stud 34 and retains first and second cover portions 18 and 20 in the closed condition. The assembled air bag module 10 can then be secured to the seat frame member 102 of vehicle seat 104 with projecting mounting studs 34 and then enclosed by a seat cover and any other additional material.

Note that lead wires 202 (FIGS. 1 and 3) on inflator assembly 32 extend out of air bag 30 through another opening (not shown). Lead wires 202 are accessible through openings 204 of cover member 12, preferably at located at a side wall 17 of second cover portion 16 near inflator assembly 32 (when mounted or arranged therein). Lead wires 202 are connected to a sensor 208 found in most vehicles. Sensor 208 can sense a side impact to the vehicle and, in response thereto, electrically actuate inflator assembly, via lead wires 202. Sensor 208 can be configured to actuate inflator assembly 32 at predetermined impact threshold levels. To further explain the present invention, an operational example of air bag module 10 in the event of a side impact vehicular collision is provided below.

Initially, sensor 208 detects an impending occurrence of a side impact to a vehicle with air bag module 10 and, in response, actuates inflator assembly 32 to release inflation fluid into air bag 30, via fluid outlets 38. The flow of inflation fluid rapidly inflates air bag 30. The expanding air bag 30 presses against cover member 12 and forces rupturable portion 42 of strap 40 to tear or break. As air bag 30 continues to expand, outer edge portions 18 and 20 of first and second cover portions 14 and 16 move away from each other by pivotable movement about hinge 24. Cover member 12 opens sufficiently that air bag 30 inflates, between the spaced apart outer edge portions 18 and 20 of first and second cover portions 14 and 16.

With the foregoing description of the invention, those skilled in the art will appreciate the modifications may be made to the invention without departing from the spirit thereof. Therefore, it is not intended that the scope of the invention be limited to the specific embodiments illustrated and described.

We claim:

1. In an air bag module housing for receiving and retaining an inflatable device and an inflator, the air bag module housing including a cover for holding said inflatable device and said inflator, said cover including a first portion and a second portion which are pivotable to an open condition for deploying said inflatable device and a closed condition for holding said inflatable device and said inflator, the improvement comprising:

the air bag module housing further comprising a strap means for releasably retaining said first portion and said second portion in the closed condition, said strap means having a rupturable portion, wherein the force of inflation of said inflatable device causes said rupturable portion to rupture and release said first portion and said second portion from the closed condition, thereby enabling said first portion and said second portion to pivot to the open condition and enabling inflation of said inflation device from said cover.

2. An air bag module housing according to claim 1, wherein said strap means includes a first end and a second end opposite said first end, said first end being connected to said first portion.

3. An air bag module housing according to claim 2, wherein said rupturable portion is situated at either said first end or said second end of said strap means.

4. An air bag module housing according to claim 2, wherein said rupturable portion is situated proximal either said first end or said second end of said strap means.

5. An air bag module housing according to claim 2, wherein said inflator is mountable in said cover such that a mounting stud from said inflator extends through said second portion, said second end of said strap means being connectable to a portion of said mounting stud extending through said second portion.

6. An air bag module housing according to claim 5, wherein said second end includes an opening for mating with said portion of said mounting stud extending through said second portion.

7. An air bag module housing according to claim 6, wherein said opening is approximately key-shaped.

8. An air bag module housing according to claim 2, further comprising a plurality of strap means connected to said first portion.

9. An air bag module housing according to claim 8, wherein said inflator is mountable in said cover such that mounting studs from said inflator extend through said second portion, each of said second end of said plurality of strap means being connectable to a portion of corresponding said mounting studs extending through said second portion.

10. An air bag module housing according to claim 1, wherein said rupturable portion of said strap means includes at least one hole.

11. An air bag module housing according to claim 10, wherein said rupturable portion includes a plurality of said holes spaced-apart along a row.

12. An air bag module housing according to claim 1, wherein said rupturable portion includes at least one indentation.

13. An air bag module housing according to claim 1, wherein said strap means is made of thermoplastic polymeric material.

14. An air bag module housing according to claim 1, wherein said rupturable portion of said strap means has a smaller cross-sectional area than a cross-sectional area of an adjacent portion of said strap means.

15. An air bag module housing according to claim 1, wherein said first portion is connected to said second portion by at least one hinge.

16. An air bag module assembly comprising:

an inflatable device having a deflated condition;

an inflator in fluid communication with said inflatable device and actuatable to provide inflation fluid for inflating said inflatable device from said deflated condition;

a cover for housing said inflatable device and said inflator, said cover including a first portion and a second portion, said first portion and said second portion being pivotable to a closed condition for holding said inflatable device and said inflator and an open condition for deploying said inflatable device from said cover; and strap means for releasably retaining said first portion and said second portion in the closed condition, said strap means having a rupturable portion, wherein the force of inflation of said inflatable device causes said rupturable portion to rupture and release said first portion and said second portion from the closed condition, thereby enabling said first portion and said second portion to pivot to the open condition and enabling inflation of said inflation device from said cover.

17. The air bag module assembly according to claim 16, wherein said strap means includes a first end and a second end opposite said first end, said first end being connected to said first portion.

18. The air bag module assembly according to claim 17, wherein said rupturable portion is situated at either said first end or said second end of said strap means.

19. The air bag module assembly according to claim 17, wherein said rupturable portion is situated proximal either said first end or said second end of said strap means.

20. The air bag module assembly according to claim 17, wherein said inflator is mounted in said cover such that a mounting stud from said inflator extends through said second portion.

21. The air bag module assembly according to claim 20, wherein said second end includes an opening for mating with said portion of said mounting stud extending through the other of said first portion and said second portion.

22. The air bag module assembly according to claim 20, wherein said opening is approximately key-shaped.

23. The air bag module housing according to claim 17, further comprising a plurality of strap means connected to said first portion.

24. The air bag module housing according to claim 23, wherein said inflator is mounted in said cover such that mounting studs from said inflator extend through said second portion, each of said second end of said plurality of strap means being connected to a portion of corresponding said mounting studs extending through said second portion.

25. The air bag module assembly according to claim 16, wherein said rupturable portion of said strap means includes at least one hole.

26. The air bag module assembly according to claim 16, wherein said rupturable portion includes at least one indentation.

27. The air bag module assembly according to claim 16, wherein said strap means is made of thermal plastic.

28. The air bag module assembly according to claim 16, wherein said rupturable portion of said strap means has a smaller cross-sectional area than a cross-sectional area of an adjacent portion of said strap means.

29. The air bag module assembly according to claim 16, wherein said first portion is connected to said second portion by a hinge.

* * * * *